United States Patent [19]

Greger et al.

[11] Patent Number: 5,291,337
[45] Date of Patent: Mar. 1, 1994

[54] DEVICE FOR ADJUSTING THE MAGNIFICATION OF A FLEXIBLE MIRROR AND A METHOD OF MAKING THE SAME

[75] Inventors: Jeff Greger, Lansdowne; Charles Geltz, Drexel Hill, both of Pa.

[73] Assignee: Zenith Products Corp., Aston, Pa.

[21] Appl. No.: 964,231

[22] Filed: Oct. 21, 1992

[51] Int. Cl.5 .............................. G02B 7/182; G02B 5/08
[52] U.S. Cl. .................................... 359/846; 359/873; 359/900
[58] Field of Search .............. 359/846, 847, 873, 849, 359/872

[56] References Cited

U.S. PATENT DOCUMENTS

| | | | |
|---|---|---|---|
| 408,511 | 8/1889 | O'Brien | 359/846 |
| 3,610,738 | 10/1971 | Bochmann | 350/295 |
| 3,623,793 | 11/1971 | Merten | 350/295 |
| 3,628,852 | 12/1971 | Snaper et al. | 359/849 |
| 3,832,039 | 8/1974 | Doolittle | 350/295 |
| 3,839,632 | 10/1974 | Federico | 240/44.1 |
| 3,893,755 | 7/1975 | Cobarg et al. | 350/295 |
| 4,119,366 | 10/1978 | Lemaitre | 350/295 |
| 4,128,310 | 12/1978 | Miller | 350/295 |
| 4,288,146 | 9/1981 | Johnson, Jr. et al. | 359/847 |
| 4,422,723 | 12/1983 | Williams, Jr. et al. | 350/295 |
| 4,548,482 | 10/1985 | Williams, Jr. et al. | 350/608 |
| 4,734,557 | 3/1988 | Alfille et al. | 219/121 LQ |
| 4,836,668 | 6/1989 | Christianson | 350/588 |
| 4,904,072 | 2/1990 | Christianson | 350/607 |
| 4,993,821 | 2/1991 | Christianson | 350/584 |

Primary Examiner—Scott J. Sugarman
Assistant Examiner—John Juba, Jr.
Attorney, Agent, or Firm—Panitch Schwarze Jacobs & Nadel

[57] ABSTRACT

The present invention is a device for adjusting the magnification of a flexible mirror and a method of making the same. The device includes a flexible mirror having a reflective surface and a rear surface surrounded by a periphery. The device also includes a housing having a retainer member for retaining the mirror and a base member supported on the housing. The base member has an aperture therethrough and includes a plurality of angled guide members located about the periphery of the aperture. A retention member, which is connected to the rear surface of the mirror, includes a protrusion which is received in an aperture of an adjustment member and permits the adjustment member to rotate freely about the retention member. The adjustment member also includes a plurality of retainer members which are inserted into the aperture of the base member and engage the angled surfaces of the guide members. The adjustment member may be rotated in a first direction to displace the retainer members along the angled surfaces to cause the generally flat mirror to assume a concave shape and in a second direction to flatten the mirror.

13 Claims, 3 Drawing Sheets

DEVICE FOR ADJUSTING THE MAGNIFICATION OF A FLEXIBLE MIRROR AND A METHOD OF MAKING THE SAME

FIELD OF THE INVENTION

The invention relates a device for adjusting-the magnification of a flexible mirror and method of assembling the same and, more particularly, to a readily assembled device which permits a flexible mirror to be easily adjusted between a generally flat and a generally concave shape.

BACKGROUND OF THE INVENTION

It is desirable to have a mirror in which the degree of curvature of the face of the mirror may be adjusted to reflect a magnified image. More specifically, it may be desirable to have a mirror which may be adjusted from a flat mirrored surface which reflects a true image to a concave surface to magnify a portion of the image. For example, such a mirror may be used by a person applying cosmetics to the face. When the mirrored surface is flat, a true image of the entire face is provided and when the mirror is moved to a concave shape, the image is magnified to enable the person to more precisely apply cosmetics to their face. Such mirrors may also be used in a bathroom or a washroom to facilitate shaving, for example.

Typical prior art mirror devices having adjustable magnification are not easily manufacturable. For example, assembly may be unduly complicated by use of many intricate parts. Typical prior art adjustable mirrors may also be expensive, both in terms of assembly time and the cost of manufacturing many intricate components. There is a need in the art for a device for adjusting the magnification of a flexible mirror to a concave shape which is inexpensive, easily assembled and readily manufactured from simple components.

U.S. Pat. No. 408,511 discloses an astronomical mirror device in which the mirror may be bent into a concave shape by use of threaded adjustment tubes. A hole is drilled in the center of the mirror and disks having corresponding holes therethrough are placed on either side of the mirror. A threaded tube is inserted through the holes and engages the disks. The tube also includes internal threads which engage external threads of a second tube. The second tube may be rotated to draw the mirror into a concave shape.

U.S. Pat. No. 3,839,632 discloses a combination spotlight and floodlight in which the center of the back of the reflector is coupled to and moved by a screw which moves linearly in a direction perpendicular to the back of the reflector. A gear has a central threaded section that mates with the screw. As the gear is rotated, the screw moves in a direction perpendicular to the back of the reflector to move the reflector to a spotlight position in which the reflector has its greatest curvature. Once in the spotlight position, the gear may be rotated in the opposite direction to move the screw to a floodlight position in which the reflector has its least curvature.

U.S. Pat. No. 4,119,336 discloses deformable mirrors having variable focal distances. A force may be exerted on the back of the mirror by means of an axial screw which is held fast with a spherical swivel molded in the center of the back of the mirror. The screw includes two spherical half-cavities in which the swivel joint is positioned. The screw is screwed in a threaded bore passing through a swivel joint which is engaged in a spherical housing made in the base. By screwing or unscrewing the screw into the swivel joint, a force is exerted on the mirror to deform the mirror to a concave shape by a pulling force and a convex shape by a thrusting force. Swivel joints make it possible to avoid the screw transmitting to the mirror forces other than axial forces.

SUMMARY OF THE INVENTION

Briefly, one aspect of the present invention is a device for adjusting the magnification of a flexible mirror. The flexible mirror has a reflective obverse surface. A rear surface is located generally opposite the reflective surface. A periphery surrounds each of the reflective surface and the rear surface. The device also comprises a housing having a retainer means for retaining the mirror. A base member is supported on the housing. The base member has an aperture therethrough which includes a plurality of guide members located about the periphery of the aperture. Each of the guide members has a surface angled with respect to a major plane of the base member. The device also comprises a retention member connected to the rear surface of the mirror and which projects generally away from the rear surface. The device further comprises an adjustment member having an aperture for receiving and securing the retention member and permitting the adjustment member to rotate freely about the retention member. The adjustment member further comprises a plurality of retainer members for being inserted into the aperture of the base member in engagement with an angled surface of the guide members. The adjustment member is retained on the base and may be rotated to displace the retainer members along the angled surfaces from a first position with respect to the guide members in which the flexible mirror is generally flat to a second position in which the flexible mirror has a generally concave shape.

Another aspect of the present invention is a method for assembling a device for adjusting the magnification of a flexible mirror. The flexible mirror has a reflective obverse surface. A rear surface is located generally opposite the reflective surface. A periphery surrounds each of the reflective surface and the rear surface. The device also comprises a housing having a retainer means for retaining the mirror. A base member is supported on the housing. The base member has an aperture therethrough which includes a plurality of guide members located about the periphery of the aperture. Each of the guide members has a surface angled with respect to a major plane of the base member. The device also comprises a retention member connected to the rear surface of the mirror and which projects generally away from the rear surface. The device further comprises an adjustment member having an aperture for receiving and securing the retention member and permitting the adjustment member to rotate freely about the retention member. The adjustment member further comprises a plurality of retainer members. The method comprises the steps of: inserting the plurality of retainer members of the adjustment member into the aperture of the base member; and inserting the retention member into the aperture of the adjustment member, such that the adjustment member is retained on the base member and may be rotated to displace the retainer members along the angled surfaces from a first position with respect to the guide members in which the flexible mirror is generally flat to a second position in which the flexible mirror has a generally concave shape.

BRIEF DESCRIPTION OF THE DRAWINGS

The foregoing summary, as well as the following detailed description of the preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawing.

DESCRIPTION OF THE PREFERRED EMBODIMENT

Figure 1:
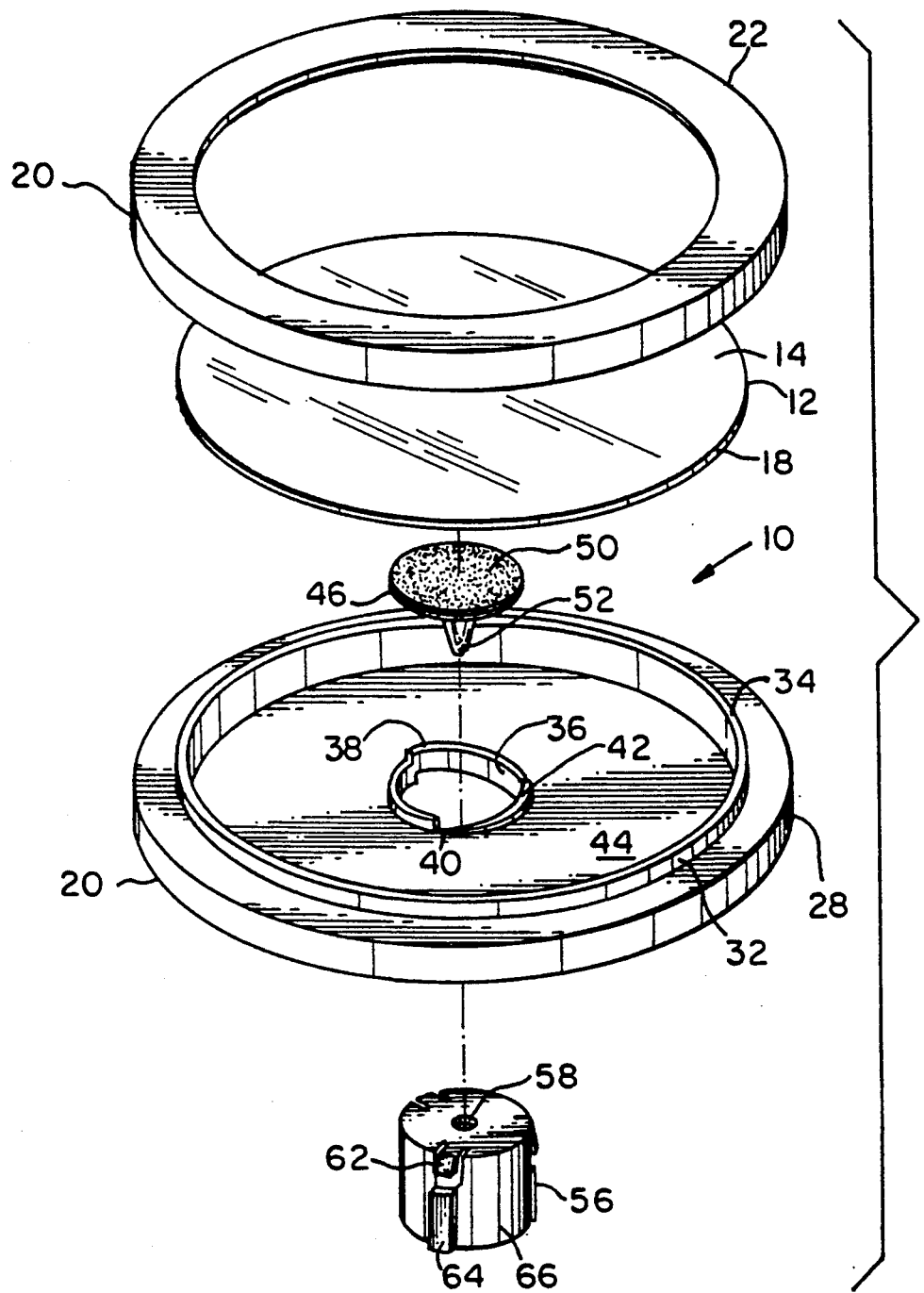
FIG. 1 is an exploded perspective view of a device for adjusting the magnification of a flexible mirror according to the present invention.

Referring to the drawings, wherein like numerals indicate like elements throughout, there is shown in FIGS. 1-5 a preferred embodiment of a device, generally designated 10, for adjusting the magnification of a flexible mirror 12.

As best shown in FIG. 1, the flexible mirror 12 has a reflective obverse surface 14. Suitable materials from which the mirror 12 may be formed include plastics, such as acrylics and polycarbonates. Preferably, the reflective surface 14 is substantially covered by a film or chemical coating for inhibiting the formation of moisture on the surface 14. The reflective surface 14 of the mirror 12 may be covered by a flexible film or chemical coating or treated by a number of methods well known to those of ordinary skill in the art in order to render the reflective surface 14 fog-free, and further discussion thereof is not believed to be necessary nor is it limiting.

Although the reflective surface 14 is normally generally flat, the reflective surface 14 may be curved. The mirror 12 may comprise a single reflective surface 14 or a plurality of interconnected reflective surfaces to enhance the flexibility of the mirror. The mirror 12 should be sufficiently flexible to permit the reflective surface 14 to be moved between a generally flat position, best shown in FIG. 2 and a generally concave position, best shown in FIG. 3. Preferably, the thickness of the flexible mirror 12 is minimized to permit the mirror 12 to flex easily.

Figure 2:
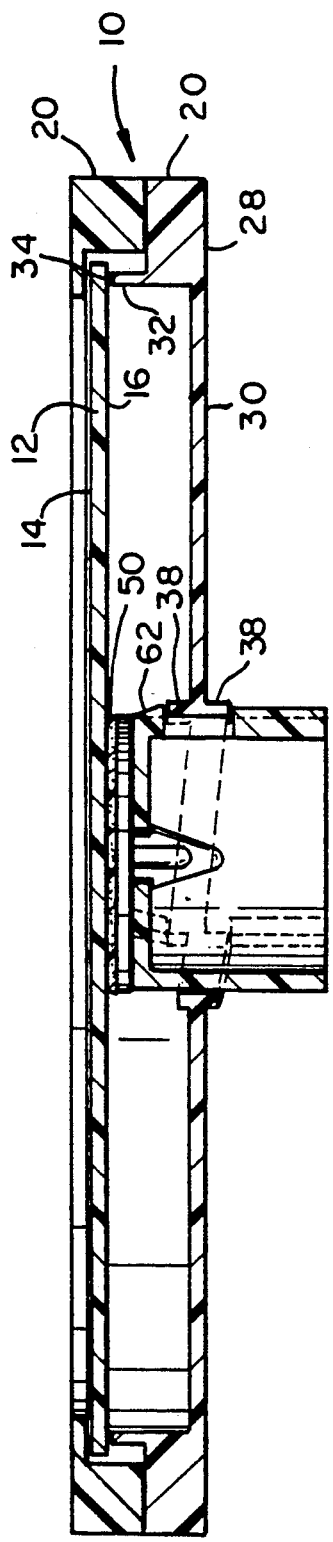
FIG. 2 is a cross-sectional view of the assembled device of FIG. 1 in which the flexible mirror is in a non-magnifying position.

As best shown in FIG. 2, the mirror 12 includes a rear surface 16 located generally opposite the reflective surface 14. Preferably, when the flexible mirror 12 is flat, the rear surface 16 is generally flat and parallel to the reflective surface 14. However, one of ordinary skill in the art would understand that the rear surface 16 need not be generally flat and parallel to the reflective surface 14, but may be curved, for example. It is preferred that the rear surface 16 be generally smooth, although the rear surface 16 may include a plurality of indentations (not shown) to enable the mirror 12 to flex more easily.

As best shown in FIG. 1, the mirror 12 includes a periphery 18. The periphery surrounds each of the reflective surface 14 and the rear surface 16. Preferably, the periphery 18 is generally smooth and perpendicular to at least one of the reflective surface 14 and rear surface 16, although the periphery 18 may be rounded or of any general shape. Both the rear surface 16 and periphery 18 are preferably integrally formed from the same material, such as plastic, although the rear surface 16 and periphery 18 may be formed from separate materials. For example, the rear surface 16 may be formed from plastic and the periphery 18 from a more rigid material, such as aluminum, to provide added structural integrity to the mirror 12.

As best shown in FIG. 2, the device 10 further includes a housing 20. The housing 20 is preferably formed from any suitable thermoplastic material. The housing 20 may alternatively or additionally be formed from a variety of materials, such as aluminum, stainless steel or other metal, for example. Generally, the housing 20 may be formed from any material having sufficient rigidity to retain the flexible mirror 12 therein and to permit adjustment of the magnification of the mirror 12.

Figure 3:
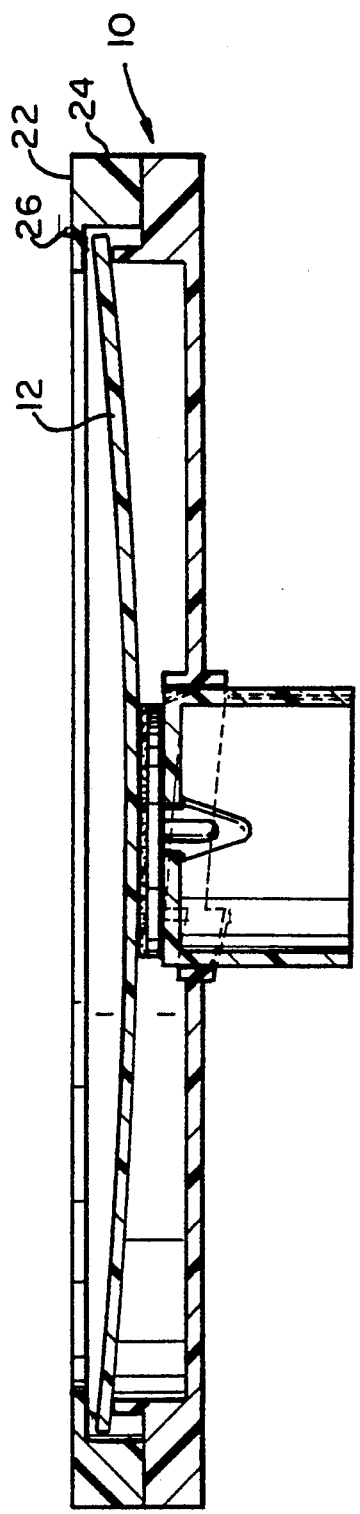
FIG. 3 is a cross-sectional view of the device in which the flexible mirror is adjusted to a magnifying shape according to the present invention.
Figure 4:
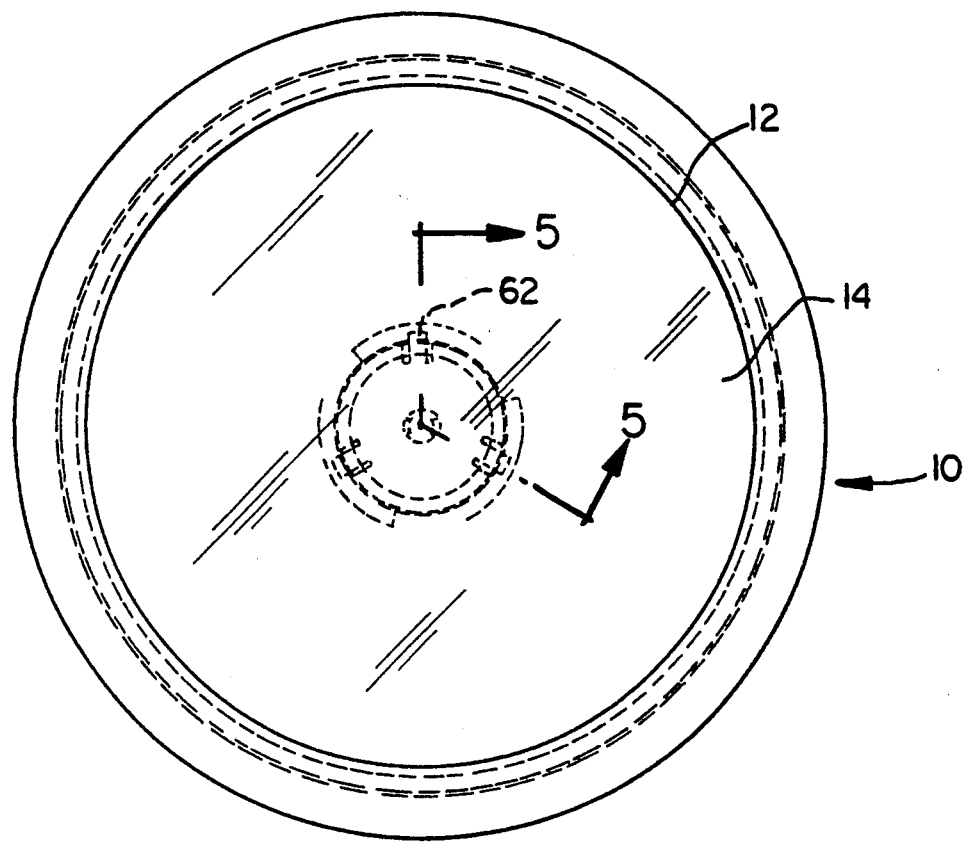
FIG. 4 is a plan view of a device according to the present invention in which a flexible mirror is adjusted to a magnifying position.

The housing 20 includes a retainer means for retaining the mirror 12. Preferably, the retainer means comprises a rim 22, best shown in FIG. 1. As shown in FIG. 3, the rim 22 constrains the periphery 18 of the mirror 12 when the mirror 12 is adjusted to a generally concave shape. Preferably, the rim 22 includes a periphery 24 which is generally parallel to the periphery 18 of the mirror 12 and generally perpendicular to at least one of the reflective surface 14 and rear surface 16 of the mirror 12. The rim 22 also includes a flange 26 extending generally inwardly from the periphery 24 to retain the mirror 12.

As best shown in FIG. 2, the housing 20 includes a base member 28, which is supported on the housing 20. Preferably, the base member 28 includes a plate 30, which is preferably generally parallel to a major plane of the flexible mirror 12 when the mirror 12 is generally flat. The thickness of the plate 30 is preferably generally greater at the periphery of the plate 30 in order to provide adequate structural support for the rim 22 of the housing 20 and adjustment of the mirror 12.

Preferably, the plate 30 includes an inwardly spaced annular rim 32 extending generally upwardly therefrom. The rim 32 includes an edge 34, at least a portion of which is in contact with the rear surface 16 of the mirror 12, near the periphery 18 of the mirror 12.

As best shown in FIG. 1, the base member 28 includes an aperture 36 extending therethrough. Preferably, the aperture 36 is generally circular and sized to receive an adjustment member 56.

Figure 5:
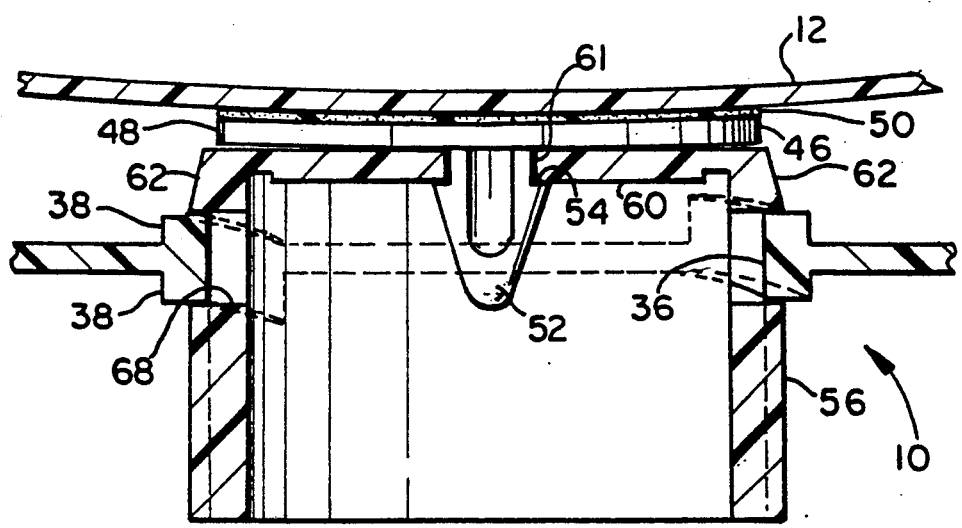
FIG. 5 is an enlarged side sectional view of the device of FIG. 4 taken along lines 5—5.

As best shown in FIGS. 1 and 5, the aperture 36 includes a plurality of guide members 38 located about the periphery 40 of the aperture 36. As best shown in FIGS. 2 and 5, the guide members 38 are preferably positioned to extend on either side of the plate 30 about the aperture 36. The guide members 38 may be formed from the same material as the base member 28 or may be formed from a different material and attached to the aperture 36 of the base member 28 by connecting means, such as glue, etc. It is also preferred that the aperture 36 include three guide members 38, although the number of guide members 38 may be less than or greater than 3, as desired.

Each of the guide members 38 has a surface 42 which is angled with respect to a major plane of the base member 28. Preferably, the angle of the guide members 38 with respect to the major plane 44 of the base member 28 is less than about 15°, although the angle may be greater than 15°, as desired.

As best shown in FIG. 1, the device 10 also includes a retention member 46 connected to the rear surface 16 of the mirror 12. The retention member 46 projects generally away from the rear surface 16 of the mirror 12. Preferably, the retention member 46 includes a plate 48.

The plate 48 is preferably attached to the rear surface 16 of the center of the mirror 12. The plate 48 may be secured to the mirror 12 by any suitable attachment means, such as glue or two-sided pressure sensitive adhesive tape 50 to facilitate assembly. The thickness and diameter of the attachment means should be minimized so as not to inhibit flexibility of the mirror 12.

As best shown in FIG. 5, the retention member 46 also preferably includes a protrusion 52. The protrusion may be generally conically shaped and includes a flange 54 formed adjacent to the plate 48 to permit the retention member 46 be snap-fit into an aperture 58 of the adjustment member 56.

The protrusion 52 is preferably formed integrally with and from the same material as the plate 48, although the protrusion 52 may be separately formed from a different material and attached to the plate 48 by, for example, glue. It is preferred that the retention member 46 be formed from an elastically deformable material, such as a thermoplastic.

The device 10 also comprises an adjustment member 56, best shown in FIGS. 1 and 5. As best shown in FIG. 1, the adjustment member 56 includes an aperture 58 extending therethrough. Preferably, the aperture 58 is generally circular and conforms generally in size and shape to the protrusion 52 of the retention member 46. The aperture 58 is preferably elastically deformable for receiving and securing the protrusion 52 of the retention member 46.

The aperture 58 is sized to permit the adjustment member 56 to rotate freely about the protrusion 52 between the plate 48 and flange 54. The adjustment member 56 includes a disk or plate 60, which includes the aperture 58. When the protrusion 52 is positioned in the aperture 58, a portion 61 of the plate 60 is positioned between the flange 58 and the plate 48 of the retention member 46 to secure the adjustment 56 to the retention member 46.

The adjustment member 56 is preferably cylindrical and further includes a plurality of retainer members 62 for being inserted into aperture 36 of the base member 28. Each of the retainer members 62 may be formed from the same material, such as plastic, as the adjustment member 56. The retainer members 62 are preferably elastically deformable to facilitate insertion into the aperture 58. The retainer members 62 may be snap-fit into the aperture 36 of the base member 28.

The retainer members 62 overlie and thereby engage the angled surfaces 42 of the guide members 38. The retainer members 62 project generally outwardly from the plate 60 and are preferably narrower at the top thereof to facilitate insertion of the adjustment member 56 into the aperture 36 of the base member 28. Each of the retainer members 62 has a corresponding protrusion 64 which extends from a portion of the adjustment member 56 and is generally perpendicular to a wall 66 of the adjustment member 56. The protrusion 64 includes an edge 68 which engages an angled surface 42 of the guide member 38 opposite the angled surface 42 which engages a corresponding retainer member 62. The protrusions 64 prevent the adjustment member 56 from being inserted too deeply into the aperture 36 of the base member 28.

The number of retainer members 62 may equal the number of guide members 38, or may be greater than or less than the number of guide members 38, as desired. Preferably, the adjustment 56 includes three retainer members 68 for engaging the angled surfaces 42 of an equal number of guide members 38.

The adjustment member 56 is retained on the base member 28 and may be rotated to displace the retain member 62 along the angled surfaces 42 of the guide members 38 from a first position with respect to the guide members 38 in which the flexible mirror 12 is generally flat (best shown in FIG. 2) to a second position in which the flexible mirror 12 has a generally concave shape (best shown in FIG. 3). As best shown in FIGS. 3 and 5, when the adjustment member 56 is rotated it moves in a direction generally perpendicular to and away from the mirror 12; i.e. in an axial direction. The portion 61 of the adjustment member 56 exerts a force on the flange 54 of the protrusion 52 which is transferred to the plate 48 of the retention member 46. The retention member 46 in turn exerts a force on the tape 50 which draws the center of the rear surface 16 of the flexible mirror 12 toward the base member 28 of the housing 20. The edge 34 of the base member 28 exerts an opposite force on the periphery 18 of the mirror 12, which causes the mirror 12 to assume a generally concave shape. When the adjustment member 56 is rotated in the opposite direction, the process is reversed and the concave curvature of the mirror may be reduced or the mirror 12 may be flattened.

When the mirror 12 assumes a concave shape, an image (not shown) projected upon the mirror will be reflected and magnified. The degree of magnification depends upon the degree of curvature of the reflective surface 14 of the flexible mirror 12. The degree of curvature may be varied, as desired, as will be understood by one of ordinary skill in the art.

The device 10 may be simply assembled, for example, by attaching the retention member 46 to the rear surface 16 of the mirror 12 by, for example, a double-sided adhesive tape 50. The mirror 12 is then positioned upon the rim 32 of the base member 28 and the rim 22 and upper portion of the housing 20 attached to the base member 28 by glue, thermal bonding, etc.

The plurality of retainer members 62 of the adjustment member 56 may be inserted and snap fit into the aperture 36 of the base member 28. The retention member 46 may then be inserted and snap fit into the aperture 58 of the adjustment member 56.

Alternatively, the adjustment member 56 may be inserted into the aperture 36 of the base member 28 prior to the base member 28 being attached to the remainder of the housing 20 having the mirror 12 positioned therein. One of ordinary skill in the art would understand that the device 10 may also be assembled in a variety of other ways.

In use, the adjustment member 56 may be rotated in a counter clockwise direction when viewing the back of the device 10 and adjustment member 56, for example, to displace the retainer members 62 along the angled surfaces 42 such that the mirror surface 14 assumes a generally concave shape. To flatten the mirror surface 14, the adjustment member 56 may be rotated in the opposite, or clockwise direction, for example.

An advantage of the present invention is the simplicity of manufacturing and assembly, as discussed above. Conventional adjustable mirrors are typically composed of many intricate parts which often require expensive, specialized fabrication equipment and tedious and time consuming assembly. The present invention may be fabricated from simple parts, many of which may be injection molded, for example. Also, the present invention is easily used since the magnification may be adjusted merely by rotating the adjustment member.

It will be appreciated by those skilled in the art that changes could be made to the embodiments described above without departing from the broad invention concept thereof. It is understood, therefore, that this invention is not limited to the particular embodiment disclosed, but it is intended to cover modifications which are within the spirit and scope of the invention as defined by the appended claims.

We claim:

1. A device for adjusting the magnification of a flexible mirror, comprising:

a flexible mirror having a reflective obverse surface, a rear surface located generally opposite said reflective surface, and a periphery surrounding each of said reflective surface and said rear surface;

a housing having a retainer means for retaining said mirror, a base member supported on said housing, said base member having an aperture therethrough including a plurality of guide members located about the periphery of said aperture, each of said guide members having a surface angled with respect to a major plane of said base member;

a retention member connected to said rear surface of said mirror and projecting generally away from said rear surface; and an adjustment member having an aperture for receiving and securing said retention member and permitting said adjustment member to rotate freely about said retention member, said adjustment member further comprising a plurality of retainer members for being inserted into said aperture of said base member in engagement with an angled surface of said guide members, such that said adjustment member is retained on said base member and may be rotated to displace said retainer members along said angled surfaces from a first position with respect to said guide members in which said flexible mirror is generally flat to a second position in which said flexible mirror has a generally concave shape.

2. A device according to claim 1, wherein said retainer means comprises a rim.

3. A device according to claim 1, wherein the number of guide members equals the number of retainer members.

4. A device according to claim 1, wherein said aperture includes three guide members and said adjustment member includes three retainer members.

5. A device according to claim 1, wherein said angle of said guide members with respect to said major plane of said base member is less than about 15°.

6. A device according to claim 1, wherein said retention member includes a plate.

7. A device according to claim 1, wherein said retention member includes a protrusion extending into said aperture in the adjustment member.

8. A device according to claim 1, wherein each of said retainer members projects generally outwardly from a wall of said adjustment member.

9. A method for assembling a device for adjusting the magnification of a flexible mirror, the device comprising a flexible mirror having a reflective obverse surface, a rear surface located generally opposite said reflective surface, and a periphery surrounding each of said reflective surface and said rear surface; a housing having a retainer means for retaining said mirror, a base member supported on said housing, said base member having an aperture therethrough including a plurality of guide members located about the periphery of said aperture, each of said guide members having a surface angled with respect to a major plane of said base member; a retention member connected to said rear surface of said mirror and projecting generally away from said rear surface; and an adjustment member having an aperture for receiving and securing said retention member and permitting said adjustment member to rotate freely about said retention member, said adjustment member further comprising a plurality of retainer members, the method comprising the steps of:

inserting said plurality of retainer members of said adjustment member into said aperture of said base member; and inserting said retention member into said aperture of said adjustment member, such that said adjustment member is retained on said base member and may be rotated to displace said retainer members along said angled surfaces from a first position with respect to said guide members in which said flexible mirror is generally flat to a second position in which said flexible mirror has a generally concave shape.

10. A method according to claim 9, wherein at least one of said retention member and said aperture of said adjustment member is elastically deformable.

11. A method according to claim 9, wherein at least one of said plurality of retainer members and said aperture of said base member is elastically deformable.

12. A method according to claim 9, wherein said retention member is snap-fit into said aperture of said adjustment member.

13. A method according to claim 9, wherein said plurality of retainer members are snap-fit into said aperture of said base member.

* * * * *